Sept. 17, 1963 W. A. GAUS 3,104,042
CARRYING CLAMPS FOR VEHICLES
Filed July 6, 1961 2 Sheets-Sheet 1
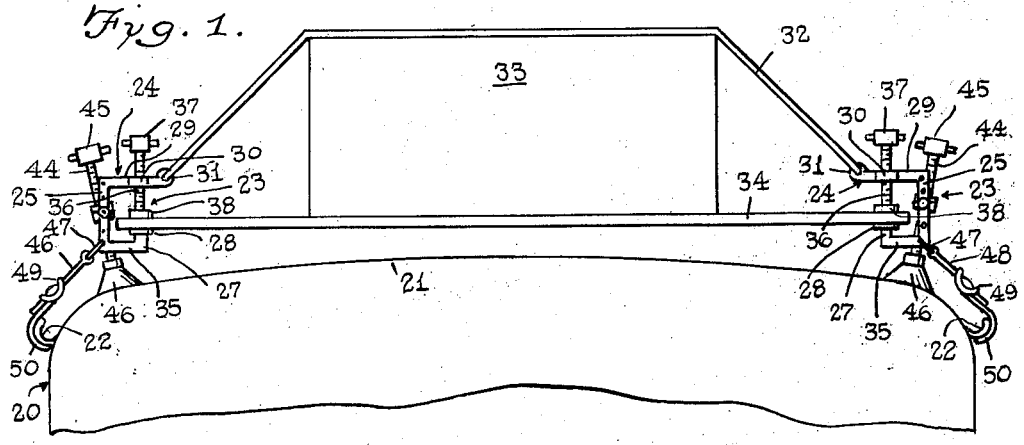
Fig. 1.
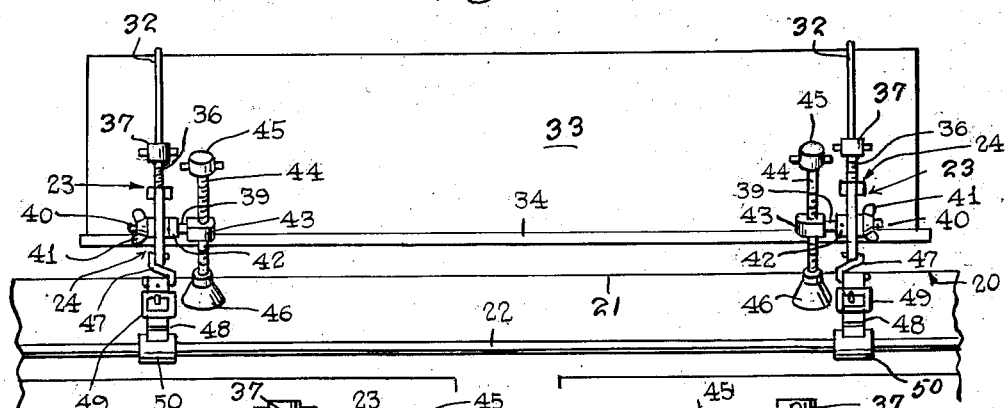
Fig. 2.
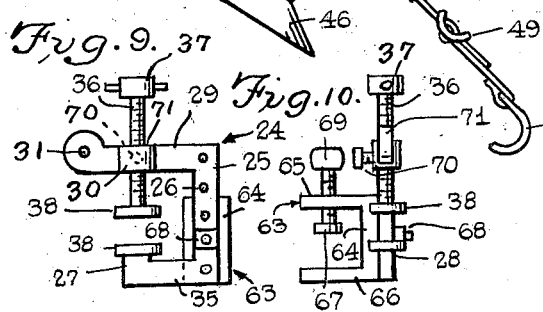
Fig. 3.
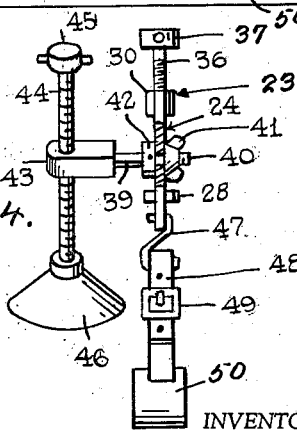
Fig. 4.
Fig. 9. Fig. 10.
INVENTOR.
Walter Anthony Gaus
BY
Victor J. Evans &Co.
ATTORNEYS

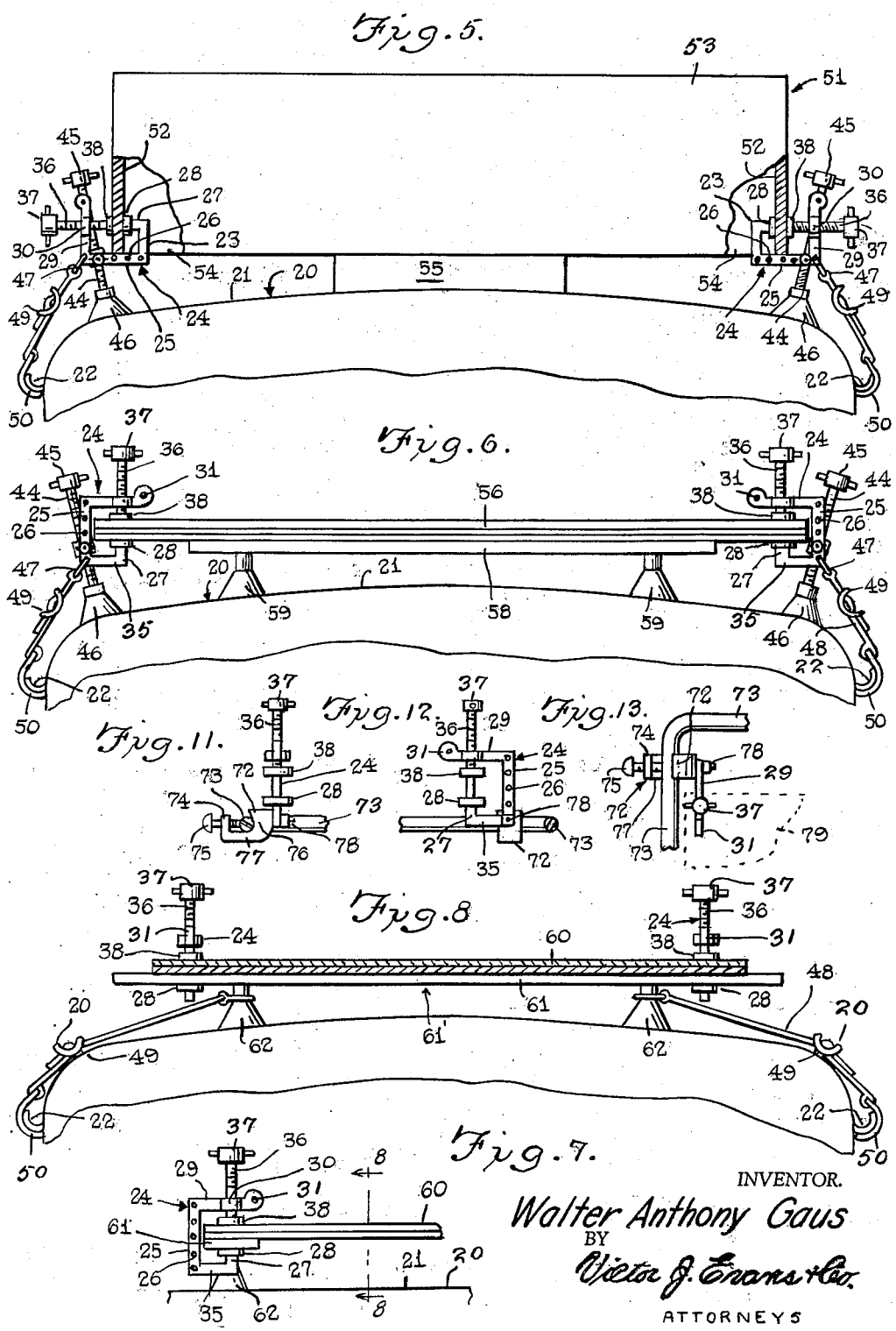

United States Patent Office 3,104,042
Patented Sept. 17, 1963

3,104,042
CARRYING CLAMPS FOR VEHICLES
Walter Anthony Gaus, Somerville, N.J.
Filed July 6, 1961, Ser. No. 122,193
1 Claim. (Cl. 224—42.1)

The present invention relates to a carrying or clamping means for the top of a vehicle, and more particularly to a clamping means for facilitating the carrying of various types of articles or cargo on top of a vehicle such as an automobile.

The primary object of this invention is to provide a means whereby various types of articles or items can be safely and conveniently mounted or held on top of a vehicle such as an automobile in order to permit convenient transporting of such articles or items to a desired location.

A further object is to provide a device of the character described which provides a strong and safe mounting or fastening means for various types of materials such as luggage, objects of regular or irregular shape, pieces of wood or the like, and wherein such articles can be conveniently clamped in place on top of a vehicle in order to facilitate carrying of the articles from place to place as desired or required.

Another object is to provide an apparatus of the character described that may be utilized speedily and with precision by even inexperienced operators.

Further objects and advantages are to provide improved elements and arrangements thereof in a device of the character described that is economical to produce, durable in form, and conducive to the most economical use of materials and uniformity of members formed therefrom.

Still further objects and advantages will become apparent in the subsequent description in the specification.

In the drawings:

FIGURE 1 is an elevational view illustrating the present invention.

FIGURE 2 is a view taken at right angles to the view shown in FIGURE 1.

FIGURE 3 is an enlarged elevational view showing one of the clamps per se.

FIGURE 4 is a view taken at right angles to the view shown in FIGURE 3.

FIGURE 5 is a view generally similar to FIGURE 1 but showing a different type of cargo or article being supported on the roof top of the vehicle, and with parts broken away and in section.

FIGURE 6 is an elevational view illustrating a modification.

FIGURE 7 is a fragmentary elevational view generally similar to FIGURE 6 but illustrating a further modification.

FIGURE 8 is a sectional view taken on the line 8—8 of FIGURE 7.

FIGURE 9 is an elevational view of a further modification.

FIGURE 10 is a view taken at right angles to the view shown in FIGURE 9.

FIGURE 11 is an elevational view of a still further modification.

FIGURE 12 is a view taken at right angles to the view shown in FIGURE 11.

FIGURE 13 is a top plan view of the device in FIGURES 11 and 12.

Referring in detail to the drawings, and more particular to FIGURES 1 through 4 of the drawings, the numeral 20 indicates a portion of a conventional vehicle such as an automobile which includes the usual top 21 as well as gutters 22 of conventional construction, and according to the present invention there are provided clamps which are each indicated generally by the numeral 23, and each of the clamps 23 is adapted to include a C-shaped upright body member which is indicated by the numeral 24.

As shown in FIGURE 3 for example, the body member 24 of a particular clamp includes or embodies a vertically disposed portion 25 which has a plurality of transversely arranged spaced apart apertures or openings 26 therein, and the numeral 35 indicates a horizontally disposed portion which is arranged at right angles with respect to the lower end of the vertical portion 25 and which is integral therewith or secured thereto. The horizontal lower portion 35 is provided on the end thereof remote from the vertical portion 25 with an upstanding portion 27 that has an enlarged flange 28 on the upper end thereof.

The body member 24 further includes a horizontally disposed upper section 29 which is arranged at right angles with respect to the vertical section 25 and is formed integral therewith, and the horizontal section 29 includes intermediate its ends an integral boss portion 30 for a purpose to be later described, and there is formed or provided on the end of the horizontal section 29 remote from the vertical portion 25 an eye portion 31 which is adapted to have a cable, line, rope or the like as indicated by the numeral 32 arranged in engagement therewith. Such cables or ropes 32 are adapted to be used for fastening or holding in place articles such as those indicated by the numeral 33, and such articles 33 may be held in place and supported on a horizontal beam or board 34. The numeral 36 indicates a vertically disposed screw member which is arranged in threaded engagement with the boss portion 30, and a handle portion 37 is operatively connected to the upper end of the screw member 36, while a flange 38 is arranged in the lower end of the screw member 36, and the flange 38 is adapted to coact with the flange 28 whereby a portion of the board 34 can be engaged or clamped therebetween.

As shown in the drawings, a securing element 39 has a portion thereof which is adapted to extend through one of the openings 26 in the vertical section 25 of the body member 24, and the securing element 39 has a threaded portion 40 whereby a fastener such as a wing nut 41 can be arranged in threaded engagement with the threaded portion 40 in order to maintain the parts in their desired adjusted position. A bushing or collar 42 is suitably affixed on the shank of the securing element 39, FIGURE 4, and the numeral 43 indicates a bushing member which is formed integral with or secured to the securing element 39 whereby a screw member 44 can be arranged in threaded engagement with the bushing member 43. The screw member 44 has a handle portion 45 on its upper end, and there is provided on the other or lower end of the screw member 44 a suction cup 46 which is adapted to engage a portion of the vehicle top 21 to help hold the parts stationary in a particular position. The numeral 47 indicates a link which has a portion thereof arranged in engagement with one of the openings 26, and a strap 48 is connected to the link 47, and the strap 48 is adapted to have a buckle 49 therein whereby the effective length of the strap 48 can be varied or changed as desired. The numeral 50 indicates a holding member which is suitably affixed to the strap 48, and the holding member 50 is adapted to engage a portion of a gutter 22, as for example as shown in FIGURE 1.

Referring now to FIGURE 5 of the drawings, there is illustrated a modification wherein the numeral 51 indicates a frame or support member which may include walls such as the walls 52 and 53, and the support member 51 may have an open bottom portion as indicated by the numeral 54 so that it will provide clearance sufficient for portions of the clamps 23. The numeral 55 indicates a spacer member which is adapted to be interposed between the top of the vehicle and the bottom portion of the member 51 in order to help maintain the member 51 in proper position on the top of the vehicle.

From the foregoing, it is apparent that there has been provided carrying clamps which are especially suitable for use in carrying various types of articles, luggage, cargo or the like on top of a vehicle such as an automobile, and in use with the parts arranged as shown in FIGURES 1 through 4 for example it will be seen that a plurality of the clamps 23 can be used as shown and for example a pair of the clamps 23 may be arranged along the upper side portions of the vehicle so that the holding members 50 can engage the usual gutters 22 on the top side portions of the vehicle. The suction cups 46 are adapted to engage the top portion of the vehicle as shown in the drawings, and by manually turning the handles 45 the screw members 44 can be adjusted in order to position the suction cups 46 in the desired position on the vehicle top. The screw members 44 are arranged in threaded engagement with the bearing blocks 43 so that by manually turning the handles 45 the screw members 44 can be adjusted in the bearing blocks 43. The bearing blocks 43 have the integral securing elements 39, and this construction is such that with the securing elements 39 extended through one of the apertures or openings 26 in the section 25 of the body member 24, the screw member 44 can be positioned as desired or required in its angular position in order to permit the suction cup 46 to fit against the roof at the proper angle. When the securing element 39 is being moved or pivoted, the wing nut 41 can be loosened, and after the securing element 39 and its associated parts have been moved to the desired or proper location, the fastener 41 can be tightened in order to maintain the parts stationary in their adjusted position.

The link 47 is adapted to be connected to one of the openings 26, and the strap 48 has the buckle 49 therein whereby the buckle 49 can be used for changing the length of the strap 48 as desired or required, and one end of the strap 48 is adapted to be connected to a link 47 while the other end of the strap 48 is suitably affixed to the holding member 50 which engages the gutter 22.

The flange 28 on the portion 27 is adapted to clampingly engage one side of an article such as the horizontal board 34 shown in FIGURES 1 and 2, and the other or upper side of the board 34 is adapted to be clamped by the flange 38 so that for example by tightening the screw member 36 by means of the handle 37 the flanges 38 and 28 will coact to clamp the board 34 therebetween. The screw member 36 is arranged in threaded engagement with the portion 30 on the body member 24. The eye portions 31 have ends of the line or rope 32 connected thereto whereby such ropes 32 can be used for fastening or maintaining items or articles such as the articles 33 in place so as for example when such articles are being supported on the board 34.

The parts can be made of any suitable material and in different shapes and sizes.

In the modification of FIGURE 5 the member 51 may be of a rectangular configuration or construction and may be of the type which has portions open at the bottom as at 54 so as to provide clearance whereby the flange 28 and associated parts of the clamps can extend through such open portions 54 in order to permit walls such as the walls 52 to be clamped between the flanges 38 and 28 when the parts are properly positioned and tightened. Portions of the bottom of the member 51 may be closed, and such closed portions may be arranged above a spacer member 55, and the member 51 can be used for holding or supporting various articles therein such as individual pieces of luggage or the like.

In the modification of FIGURE 6 the clamps of the present invention are shown being used in connection with transporting or supporting a plurality of horizontally disposed superimposed beams, plywood strips or the like as indicated by the numeral 56, and such members 56 may have edge portions thereof clamped between the flanges 38 and 28 whereby the members can be held in their proper position. Boards or beams 58 may be arranged below the strips 56, and the boards 58 may have suction cups 59 depending therefrom, whereby with the suction cups 59 engaging the top portion 21 of the vehicle, it will be additional support for the plywood sheets 56 or other articles being transported or carried.

Attention is directed now to FIGURES 7 and 8 of the drawings, wherein there is illustrated a further modification wherein the numerals 60 indicate articles such as plywood strips or pieces of lumber or wood that are being transported or held on top of the vehicle, and boards 61 may be arranged below the sheet members 60, and suction cups 62 are adapted to depend from the boards 61 for engagement with the top of the vehicle in order to help maintain these parts stationary in their desired position. In the arrangement of FIGURES 7 and 8 the parts such as the holding member 50, strap and link arrangement previously described may be used in conjunction with the suction cups 62 so as to provide a means for helping to retain the parts stationary on top of the vehicle, and in FIGURE 8 the numeral 61' indicates a portion of a conventional rack carrier that is adapted to be held in position with the normal hook-up which includes a holding member or members, straps, links and the like. That is in FIGURE 8 the conventional car carrier must be secured by normal links and straps that come with it, and the clamp holds the cargo 60 to the members 61 of the rack 61'. The parts may be arranged as shown in FIGURES 7 and 8 and the previously described ropes or cables can be used in conjunction therewith if desired or required.

Referring now to FIGURES 9 and 10 of the drawings, there is illustrated a further modification wherein the numeral 63 indicates a generally U-shaped base piece which includes a connecting section 64 as well as spaced parallel sections 65 and 66 that are arranged at right angles with respect to the section 64, and the numeral 69 indicates a screw member that is arranged in threaded engagement with the section 65, and the screw member 69 has a flange 67 on the end thereof whereby the flange 67 can coact with a part such as the section 66 so as to clampingly engage therebetween a rail such as a rectangular rail which is permanently affixed to the upper portion of a vehicle. The body member 24 is operatively connected to the section 64 of the base piece 63 as for example by means of a bolt or securing element 68. Thus, in the arrangement of FIGURES 9 and 10 suction cups may be omitted since the screw member 69 may be tightened to cause the flange 67 to coact with the section 66 whereby a square shaped rail on top of a vehicle can be clampingly engaged therebetween. Then, various types of articles can be clamped between the flanges 38 and 37 and for example a board such as the board 34 can be clamped between the flanges 38 and 28 by tightening the handle 37. In FIGURES 9 and 10 there is shown a smooth portion 71 on the screw member 36, and the smooth portion 71 may be free of threads, so that a set screw 70 can be extended through the member or portion 30 in order to engage the portions such as the portion 71 so as to help hold the screw 36 immobile in its various adjusted positions.

Referring now to FIGURES 11, 12 and 13 of the drawings, there is illustrated a further modification wherein the numeral 72 indicates a base piece which is operatively connected to the body member 24 as for example by means of bolts or securing elements 78, and the numeral 73 indicates a rail such as that adapted to be permanently affixed to the top of the vehicle, and the rail 73 may be cylindrical in formation as shown in the drawings, whereas the rail which is engaged by the base piece 63 of FIGURES 9 and 10 may be rectangular in formation. The base piece 72 includes a finger or portion 74 which has a screw member or set screw 75 arranged in engagement therewith whereby the set screw 75 can be tightened in order to cause the inner end of the set screw to engage a portion of the rail 73 as shown in FIGURE 11 for example. The base piece 72 further includes an arcuate surface or portion 76 as well as a connecting portion 77. The securing element 78 may be extended through one of the openings 26 in the section 25 of the body member 24. The flanges 38 and 28 are used for clamping therebetween various types of articles or members such as the members or articles previously described in this application. In FIGURE 13 the numeral 79 indicates in broken lines a portion of an article or item being carried or held on top of a vehicle.

In FIGURE 11 there is illustrated a bar rack type clamp, while in FIGURE 8 there is illustrated a flat stock application, and as previously stated the numeral 73 indicates a chrome or round stock rack that is conventionally used on tops of cars.

FIGURE 1 illustrates a free standing clamp application, FIGURES 9 and 10 illustrate a flat stock clamp application, and FIGURES 11, 12 and 13 indicate a round bar rack application.

The flanges such as the flanges 38 and 28 may be provided with a protective surface or covering so as to prevent marring of various surfaces which they engage. The securing element 39 provides a swivel connection to allow a proper vertical gripping action at different angles. The locking screw 75 serves to prevent accidental unclamping. The wing nut 41 permits the securing element 39 to be disconnected and arranged in engagement with the different openings 26. Instead of making the member 44 threaded, it can utilize a friction gripping means, or it may be provided with a splined, grooved or ridge locking arrangement and such mechanism will permit adjustment of the clamp to any desired height. The member 50 functions as a gutter clip. A portion such as the portion 65 shown in FIGURE 10 may be plastic lined to prevent vibration. The securing element 68, shown in FIGURES 9 and 10 functions as a swivel connection so as to permit the clamp to grip vertical edges. The coacting parts such as the parts 76, 77 and 74 shown in FIGURE 11 can be made so that they will receive parts of different sizes or shapes, and the securing elements 78 provide a swivel joint or connection.

The present invention is therefore a simple, strong, safe means of carrying various types of objects on roofs of cars, and for example the present invention can be used for carrying a large piece of plywood on a car roof such as a half rack, full rack, or free standing type. The present invention is especially suitable in connection with "do-it-yourself" types of activities as for example where a person drives up to a lumber yard or other establishment and purchases items and then carries them home himself. In addition the present invention is especially suitable for use by vacationers, and sportsmen, and the parts may be made so that they are not affected by rain or other adverse weather conditions. The clamp is versatile and it can be used in a horizontal as well as a vertical position and the suction cups permit the clamp to be mounted on any smooth surface at any angle.

Minor changes in shape, size and rearrangement of details coming within the field of invention claimed may be resorted to in actual practice, if desired.

What is claimed is:

In a clamp for a vehicle roof carrier including an upright C-shaped body member having a vertically disposed portion provided with a plurality of transversely arranged spaced openings, a horizontally disposed portion formed integrally with the lower end of said vertical portion, an upstanding portion on the end of said horizontal portion remote from said vertical portion, a first flange on the upper end of said upstanding portion, a horizontally disposed upper section formed integrally with the upper end of said vertical portion, a boss intermediate the ends of said upper section, a vertically disposed first screw member threadably engaged in said boss, and a second flange on the lower end of said screw member arranged to clampingly coact with said first flange, an eye portion on the end of said upper section remote from said vertical portion and adapted for attachment thereto of a rope, a securing element having a shank selectively and adjustably secured in one of said openings, a bushing member carried on one end of said securing element, a second screw member threadably engaged in said bushing member, a suction cup on one end of said screw member and adapted for engagement with a vehicle roof, and means for removably attaching said C-shaped body member to the rain gutter of said roof.

References Cited in the file of this patent
UNITED STATES PATENTS

| | | |
|---|---|---|
| 2,596,860 | McCrory et al. | May 13, 1952 |
| 2,636,528 | Golnick | Apr. 28, 1953 |
| 2,890,852 | Bradley | June 16, 1959 |